G. Pack,
Making Staves.
Nº 464.   Patented Nov. 11, 1837.
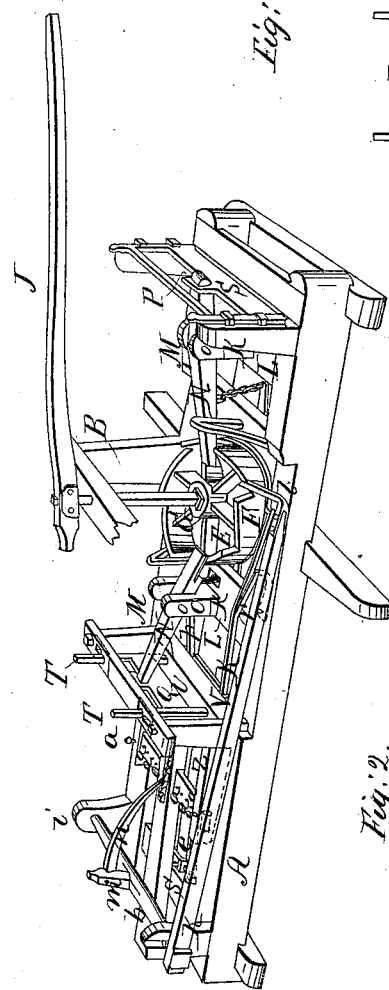

UNITED STATES PATENT OFFICE.

GEO. PACK, OF PETERBORO, NEW YORK.

MACHINE FOR CUTTING SHINGLES, STAVES, HEADING-STAVES, AND OTHER ARTICLES OF WOOD.

Specification of Letters Patent No. 464, dated November 11, 1837.

*To all whom it may concern:*

Be it known that I, GEORGE PACK, of Peterboro, in the county of Madison and State of New York, have invented a new and useful Machine for Making Shingles, Staves, Headings, and other Flat-Shaped Articles of Wood; and I do hereby declare that the following is a full and exact description of the said machine, reference being had to the annexed drawings of the same, making part of this specification.

In constructing the said machine I first form a frame A, Figure 1, of two main side sills, connected together by cross sills. From, and on each side sill, near to the center of the same, upright posts B, B, (one of which is omitted in order to show the wheel E) are raised, one on each side, connected together at the upper ends by a cross piece C, which is directly above a cross sill that connects and projects beyond the main side pieces. In this cross sill is set vertically a revolving shaft D with its upper end passing through and projecting above the said top cross piece C. On this shaft near its lower end a horizontal wheel E is fastened (which may be made of iron) consisting of a broad vertical rim F supported by arms G, radiating from the center; said rim being cut into notches somewhat similar to a saw or rack forming teeth with one side of each tooth nearly vertical and the other inclined at an angle of about 20, 30, or 40 degrees more or less as may be required and also having lesser notches I, Fig. 2, on the outer circle or periphery of the rim near the lower edge of the same. For distinction's sake I shall call the former vertical notches and vertical edge, and the latter horizontal notches and horizontal rim. This wheel when put in motion is intended to give action to the different parts of the machine by means of levers resting on the inclined side of said teeth of the vertical rim, and also other levers resting against the teeth in the periphery of the rim. The propelling power (if water or steam) is geared to a cog wheel or drum placed on the revolving vertical shaft above the serrated or toothed wheel, but if horse power is intended to be used, a sweep J, Fig. 1, fastened to the projecting top of said shaft of sufficient length to allow the horse to travel in a circle around the whole of the machine in the manner of a horse power. At a proper distance from and on each side of the serrated wheel, and between the side pieces of the main frame, an upright post K K is raised on a cross girth L, L, which post has on its upper end a deep gain M, (or rectangular channel cut down from the upper surface of the post to a sufficient depth, parallel to the main side pieces and traversing the length of said surface). This post is of a sufficient height to receive a lever N, in the gain, which lever is loosely fastened by a bolt O, that serves as a pivot or fulcrum for the lever to move on, with one end on the vertical edge of the serrated wheel and the other end resting in an eye P for that purpose made in the knife frame hereafter described. This lever is placed nearly horizontally and is parallel to the side pieces of the main frame.

This machine when used for cutting shingles, headings, staves, and other flat shaped articles from solid blocks of timber or bolts is provided with a broad knife A consisting of a flat blade having its lower edge sharpened and extended edgewise in the frame hereafter described, and being of sufficient length to divide a shingle or heading, stave, or other required article from the block or bolt, with the grain of the wood at one motion.

The knives employed in this machine are of three different kinds, to wit: one for cutting shingles, or heading, or other flat shaped articles of wood, Q; one for cutting staves, R, Fig. 4, and one for listing or jointing the edges of the staves, S, Fig. 1. The knife Q for cutting shingles or heading, or other flat shaped articles, is inserted in the knife-frame T. This frame consists of two vertical sides connected by one or more cross bars. The knife is set edgewise across said frame, the ends of the knife being secured to the sides of the frame by bolts. The cross bar of the frame rests on and supports the back of the knife, from this cross bar directly over the center of the knife an eye is raised to receive the end of the lever hereinbefore described,—the other end of the lever resting on the vertical edge of the serrated wheel as before mentioned. The side pieces of the knife frame play in boxes made in a broad girth U, connecting the two side pieces or sills of the main frame, and also play in boxes cut through a cross cap which rests on and connects two upright posts, one raised on each side of said main side pieces or sills. The boxes are sufficiently large to allow the sides of the knife frame, when in motion, to play vertically in them. Other boxes V, are also placed in said broad girth, and in the upper cross cap at various distances apart so as to admit the insertion of knife frames of different widths. The cross cap is placed over said broad girth. The upper and lower boxes are to correspond in position vertically to each other, so as to admit the knife frame to set upright with the edge of the knife downward directly over the bolt on the broad girth and subject to the action of the lever. Still farther from the serrated wheel and beyond the above described knife is placed a feeding carriage W. This carriage consists of a middle piece W, running parallel to the side pieces of the main frame. Through this middle piece near the end nearest to the knife frame a cross-bar X passes at right angles and on each end of it, opposite to each other and parallel to the middle piece is placed a shorter piece Y, forming jaws through which a screw Z, passes, parallel with cross bar X, from one to the other; by turning which screw the jaws are tightened together or relaxed at pleasure. The jaws are so set on or attached to the cross bar as also to admit of their sliding farther apart or nearer together in order to hold the different lengths of timber or bolts, which may be required, holes being made in the cross-bar X and a pin $a$ inserted therein for that purpose. To the underside of the middle piece, boxes $b$ $b$, Fig. 5, are fastened and through these a rod or bar $c$ passes, on which the carriage slides. One end of this rod rests in an eye $d$ in the broad girth, and playing in this eye acts slightly as a pivot or joint and the other end of the rod rests in a cross slide $e$, Figs. 1 and 2, set in boxes $f$ $f$ secured to a cross girth $g$ fixed near the end of the main frame. Over this last mentioned cross girth is placed a small horizontal shaft $h$ supported by uprights $i$ $i$ raised on the side pieces of the main frame, which uprights are furnished with boxes for the gudgeons of said shaft to turn in. One end of said shaft projects beyond the upright supporting it, and a long lever K is secured to this end of the shaft outside of the upright, and this lever passing outside of the main frame, rests by its other extremity bowed or bent in at right angles for that purpose at $l$ on the teeth in the vertical edge of the serrated wheel. Near the center of the shaft before described, an arm $m$ rises leaving a reaching hand $n$ loosely joined to this arm at one end, and the other end rests on a rack $o$, which is placed on the upper side of the middle piece of the feeding carriage for advancing the same with the bolt from which the required article is to be cut.

Most kinds of timber will require to be steamed before being exposed to the action of the knives in order to make the timber more elastic which is best done after it is made into bolts of the required length. The bolt or block of timber is then placed lengthwise between the jaws of the feeding carriage resting on the broad girth under the knife and the power being applied to the upright revolving shaft, the serrated wheel is thus put in motion, with the levers resting on the vertical edge of the same. As the notches and serrated projections or teeth of that edge advance, the end of the lever is raised and the opposite extremity of the lever attached to the knife frame descends with the knife which is driven through the block of timber placed beneath it and takes off or divides a shingle or heading, or other flat shaped article, as the case may be, from the block at one motion. The end of the lever resting on the wheel then is made to fall into the notch beyond the tooth which gave this motion by means of a spring or weight, and the other end with the knife frame and knife are thus raised up. The long lever connected with the feeding carriage, also receives, by means of its bowed end and the revolution of the serrated wheel a vibratory motion which it extends to the hand resting on the rack which thus advances the feeding carriage at intervals, as the knife is raised up, and advances the block of timber far enough under the knife to admit of another shingle or other flat shaped article being cut off from the block.

When the machine is used for cutting shingles, the feeding carriage has an alternate vibratory side motion for the purpose of giving the shingles a proper taper. For this purpose two more levers $p$ $p$, Figs. 1 and 2 (which I shall call "alternating levers" for the sake of distinction) are placed beneath the feeding carriage, with one end of each lever loosely joined to one end of the cross slide (before described,) so that such lever shall form an oblique line from the periphery of the serrated wheel to the nearest end of the cross slide. These alternating levers pass under the broad girth beneath the knife frame and are loosely fastened to said broad girth by bolts serving as pivots or fulcra $q$ $q$, Fig. 2, and the levers extending beyond the bolts or fulcra rest in the notches, on the periphery of the serrated wheel, one lever resting on each side of the rims of said wheel. As this wheel revolves the outside of the rim slightly presses out alternately the ends of the alternating levers and as the notches advance these ends fall into them and are pressed against the horizontal rim by means of a spring $r$, Fig. 1—placed on the outside of either lever and fastened to the main frame. By these means the motion of the levers is extended at the other end of them to the cross slide and thus to the feeding carriage, which gives to the block of timber or shingle bolts a slight advance, first at on end and then at the other end alternately so that the shingles are successively cut from the blocks with the proper tapers.

The knife for cutting staves with its frame is like the shingle or heading knife and frame:—except that the former knife and frame are both curved in such a manner as to shape the staves ready for casks, except jointing them. See B, Fig. 4. The stave knife and frame are placed similarly over the broad girth, the frame being inserted in the extra boxes of the broad girth and of the cross cap above it (both of which are before described) instead of the shingle or flat material knife. The stave knife and frame are acted on by the same lever that moves the shingle knife and frame, and it moves in the arc of a circle, the feeding carriage operating in the same manner as before described, except that in all cases where the side motion is not required the action of the alternating levers is to be stopped.

The knife for jointing staves is like the shingle or heading knife except that it is longer in proportion to its width and has a slight bow or sweep convex toward the serrated wheel, and suited to form the edges of the stave with a proper bilge. See s, Fig. 1. The frame which supports this knife is in all respects similar to the shingle or heading knife frame before described and is placed on the opposite side of the serrated-wheel and is supported and inserted in boxes similar to those in the cross sill and broad girths supporting the shingle knife frame (except that the extra boxes may be dispensed with) and a corresponding lever resting on the vertical edge of the serrated wheel is also placed and applied to this jointing knife frame in a similar way to that hereinbefore described for the shingle knife frame. The feeding carriage-alternating levers and long lever acting outside of the main frame are not applied to the jointing knife and frame.

The invention claimed by me, the said GEORGE PACK, and which I desire to secure by Letters Patent, consists in—

1. The compound serrated wheel for moving the levers constructed and combined in the manner before described.

2. The arrangement of the boxes for several sized knife frames as before described.

3. The construction of the curved knife for cutting staves as before described.

4. The levers at the sides of the serrated wheel for vibrating the carriage.

5. The bar on which the carriage moves longitudinally and with it vibrates transversely in combination with the vibrating cross slide attached to the ends of the alternating levers, and to the carriage.

GEORGE PACK.

Witnesses:
WM. P. ELLIOT,
WM. BISHOP.